(12) United States Patent
Ellwood et al.

(10) Patent No.: US 12,270,699 B2
(45) Date of Patent: Apr. 8, 2025

(54) FIBRE OPTIC CABLE SENSING APPARATUS

(71) Applicant: OptaSense Holdings Limited, Camberley (GB)

(72) Inventors: Robert Ellwood, Farnborough (GB); Alastair Godfrey, Farnborough (GB)

(73) Assignee: OptaSense Holdings Limited

( * ) Notice: Subject to any disclaimer, the term of this patent is extended or adjusted under 35 U.S.C. 154(b) by 199 days.

(21) Appl. No.: 17/906,566

(22) PCT Filed: Feb. 26, 2021

(86) PCT No.: PCT/GB2021/050497
§ 371 (c)(1),
(2) Date: Sep. 16, 2022

(87) PCT Pub. No.: WO2021/186147
PCT Pub. Date: Sep. 23, 2021

(65) Prior Publication Data
US 2023/0160742 A1    May 25, 2023

(30) Foreign Application Priority Data

Mar. 18, 2020   (GB) ..................................... 2003892

(51) Int. Cl.
*G01L 1/24*   (2006.01)
*G01D 5/353*   (2006.01)
*G01H 9/00*   (2006.01)

(52) U.S. Cl.
CPC ......... *G01H 9/004* (2013.01); *G01D 5/35361* (2013.01)

(58) Field of Classification Search
CPC ....... G01L 1/243; G01L 1/242; G01L 11/025; G01L 1/247; G01H 9/004; G01D 5/3538;
(Continued)

(56) References Cited

U.S. PATENT DOCUMENTS

2012/0226452 A1\* 9/2012 Hill .................. G01H 9/004
702/56
2018/0245957 A1\* 8/2018 Farhadiroushan ... G01D 5/3537
(Continued)

FOREIGN PATENT DOCUMENTS

EP          3540483          9/2019
GB          2188719     \*    4/1986      .............. G02B 6/16
(Continued)

OTHER PUBLICATIONS

Intellectual Property Office, Search Report mailed on Oct. 27, 2020, issued in connection with Application No. GB2003892.3, 3 pages.
(Continued)

*Primary Examiner* — Michelle M Iacoletti
*Assistant Examiner* — Maher Yazback
(74) *Attorney, Agent, or Firm* — McDonnell Boehnen Hulbert & Berghoff LLP (57) ABSTRACT

This application describes a fibre optic cable structure which is advantageous for distributed fibre optic sensing, for example distributed acoustic sensing (DAS). The fibre optic cable structure includes an optical fibre for distributed fibre optic sensing and is configured to comprise at least one longitudinal section of a first type, which exhibits a change in effective optical path length of the optical fibre of one polarity in response to a given applied force, and which is adjacent to at least one longitudinal section of a second type, which exhibits a change in effective optical path length of the optical fibre of the opposite polarity in response to an equivalent applied force. When used for DAS, the response of a sensing portion that includes sections of both the first and second types, will include or exclude certain wavenumber by summation, which provides a directional sensitivity to incident waves.

17 Claims, 4 Drawing Sheets

(58) Field of Classification Search
CPC ............. G01D 5/35361; G01D 5/3537; G01D 5/35316; G01D 5/35364; G01D 5/35374; G02B 6/4415; G02B 6/4432; G02B 6/4433; G02B 2006/12138; G02B 6/443; G02B 6/4402
See application file for complete search history.

(56) References Cited

U.S. PATENT DOCUMENTS

| | | | | |
|---|---|---|---|---|
| 2018/0274954 A1* | 9/2018 | Pacini | ................ | G01D 5/35374 |
| 2022/0034688 A1* | 2/2022 | Godfrey | ............. | G01K 11/3206 |
| 2022/0341798 A1* | 10/2022 | Kishida | ................. | G01H 9/006 |

FOREIGN PATENT DOCUMENTS

| | | |
|---|---|---|
| WO | 00/003217 | 1/2000 |
| WO | 2015/170117 | 11/2015 |
| WO | 2016/055787 | 4/2016 |
| WO | 2018/142113 | 8/2018 |

OTHER PUBLICATIONS

International Searching Authority, International Search Report and Written Opinion mailed on Jun. 11, 2021, issued in connection with International Patent Application No. PCT/GB2021/050497 filed on Feb. 26, 2021, 13 pages.

* cited by examiner

FIBRE OPTIC CABLE SENSING APPARATUS

CROSS-REFERENCE TO RELATED APPLICATIONS

The present application is a national stage entry of PCT/GB2021/050497 filed Feb. 26, 2021, which claims priority to GB 2003892.3 filed on Mar. 18, 2020, the contents of each of which are hereby incorporated by reference.

FIELD OF THE DISCLOSURE

This application relates to methods and apparatus for fibre optic sensing, and to fibre optic cables suitable for fibre optic sensing and in particular to methods and apparatus for distributed fibre optic sensing that provide steerable directional sensitivity.

BACKGROUND

Various types of fibre optic sensing are known, where an optical fibre is deployed as a sensing fibre and interrogated with electromagnetic radiation to provide sensing of environmental stimuli along its length, e.g. dynamic strains acting on the sensing fibre.

One known type of fibre optic sensing is distributed fibre optic sensing, which involves interrogating the sensing fibre with optical radiation and analysing the backscatter from within the sensing optical fibre to detect environmental disturbances on the sensing fibre. By analysing this radiation backscattered from within the fibre, the fibre can effectively be divided into a plurality of discrete sensing portions which may be (but do not have to be) contiguous. Within each discrete sensing portion disturbances of the fibre, for instance, dynamic strains due to incident acoustic waves, cause a variation in the properties of the radiation which is backscattered from that portion. This variation can be detected and analysed and used to give an indication of the disturbance acting on the fibre at that sensing portion. The distributed fibre optic sensor can effectively act as a sensing array of independent sensing portions of the optical fibre. Distributed acoustic sensing (DAS) is one particular form of distributed fibre optic sensing used to sense mechanical disturbances or strains acting on the sensing fibre.

Some fibre optic based sensors rely on deliberately introduced features within the fibre, e.g. fibre Bragg gratings or the like, to induce reflection from a point in the fibre. In a fibre optic distributed acoustic sensor, however, radiation which is backscattered from inherent, i.e. intrinsic, scattering sites within the fibre may be detected. The sensing function is thus distributed throughout the fibre and the spatial resolution and arrangement of the various sensing portions depends on the characteristics of the interrogating radiation and the processing applied.

Various types of DAS sensor have been demonstrated including sensors based on Rayleigh scattering of coherent light from the sensing fibre. Light transmitted into an optical fibre will be Rayleigh scattered from the various scattering sites within an optical fibre. A mechanical vibration or dynamic strain acting on the fibre, such as caused by an incident acoustic wave, will effectively alter the distribution of scattering sites resulting in a detectable change in the properties of the Rayleigh backscattered light. Analysing such changes allows vibrations/acoustic stimuli acting on sensing portions of the optical fibre to be detected.

Such DAS sensors therefore typically perform repeated interrogations of the sensing fibre, where each interrogation involves transmitting at least one pulse of coherent optical radiation into the optical fibre and detecting the optical radiation which is backscattered from within the fibre. The backscatter from each of a number of different sensing portions of the sensing fibre, also called channels, of the DAS sensor may be processed separately to provide a measurement signal of any disturbances acting on that sensing portion.

In one type of DAS sensor, the intensity of Rayleigh backscatter from a given channel in response to separate interrogations of the sensing fibre is monitored to determine any acoustic stimulus acting on the fibre and, in one example, each interrogation involves launching a single continuous pulse of coherent interrogating radiation. As mentioned above the backscatter from the fibre will depend on the distribution of the inherent scattering sites within the fibre, which will vary effectively randomly along the length of the fibre. Thus, the backscatter intensity from any given interrogating pulse will exhibit a random variation from one sensing portion to the next but, in the absence of any environmental stimulus, the backscatter intensity from any given sensing portion should remain the same for each repeated interrogation (provided the characteristics of the interrogating pulse remains the same). However an environmental stimulus acting on the relevant sensing portion of the fibre will result in an optical path length change for that section of fibre, e.g. through stretching/compression of the relevant section of fibre and/or a refractive index modulation. As the backscatter from the various scattering sites within the sensing portion of fibre will interfere to produce the resulting intensity, a change in optical path length will vary the degree of interference and thus result in a change in backscatter intensity. This change in intensity can be detected and used as an indication of a disturbance acting on the fibre, such as an incident acoustic wave.

In another type of DAS sensor, the backscatter signal is processed to determine a phase change. In one example each interrogation involves launching two pulses of coherent radiation of differing optical frequencies into the fibre. This means that the Rayleigh backscatter received at the detector comprises backscatter from both pulses, which will interfere, and thus there will be a signal component at the frequency difference between the pulses. If the two pulses are spatially separated in the fibre then an environmental disturbance acting on the fibre, between portions of the fibre where the pulses are reflected from, can lead to an optical path length change. This in turn will produce a phase change in the signal at this difference frequency, which can be thought of as a signal at a carrier frequency. Through an appropriate choice of carrier frequency and processing of the detected signal, this phase change can be related to the amplitude of the disturbance acting on the fibre. Again the characteristics of the interrogating radiation, i.e. the frequencies and durations of the two pulses, would typically be the same for each interrogation. Such a phase based DAS system can provide an indication of the actual amount of phase shift caused by an incident stimulus and thus provide a quantitative measure of amplitude of any disturbance.

Such DAS systems can usefully be employed in a number of applications to provide an indication of acoustic waves incident on the sensing fibre which can thus provide information about the environment in which the sensing fibre is located, for instance to identify and/or characterise events of interest in the vicinity of the fibre.

In some applications it would also be useful to provide an indication of the direction of incidence of the acoustic waves, for instance to allow a direction to the location of an event of interest to be determined or to distinguish between signals incident from different directions.

SUMMARY

Embodiments of the present disclosure relate to fibre optic cable structures and to methods and apparatus for fibre optic sensing that may provide additional and/or improved functionality.

Thus, according to an embodiment of the present invention there is provided a fibre optic cable structure, comprising:

an optical fibre for distributed fibre optic sensing;
the fibre optic cable structure being configured to comprise:
at least one longitudinal section of a first type which exhibits a change in effective optical path length of the optical fibre of one polarity in response to a given applied force and which is adjacent to
at least one longitudinal section of a second type which exhibits a change in effective optical path length of the optical fibre of the opposite polarity in response to an equivalent applied force.

In some embodiments the fibre optic cable structure may comprise a plurality of longitudinal sections of the first type and a plurality longitudinal sections of the second type, with each section of the first type being adjacent a section of the second type. Each of the longitudinal sections of the first type and each of longitudinal sections of the second type have the same longitudinal length as one another.

In some implementations the fibre optic cable structure comprises at least one strain transformer configured to transform a radial strain into a longitudinal strain. The properties of the strain transformer may vary along the length of the fibre optic cable structure so as to provide the at least one longitudinal section of the first type and the at least one longitudinal section of the second type. In some examples the strain transformer may comprise a braid structure comprising a plurality of interleaved braid members. In some embodiments, in a longitudinal section of the first type, the braid members of the relevant strain transformer may have a first cross-sectional size and in a longitudinal section of the second type, the braid members of the relevant strain transformer may have a second, different cross-sectional size. Additionally or alternatively, in a longitudinal section of the first type, the braid members of the relevant strain transformer may be embedded in a matrix material and in a longitudinal section of the second type, the braid members of the relevant strain transformer may not be embedded in a matrix material. Additionally or alternatively, in a longitudinal section of the first type, the braid members of the relevant strain transformer may have a first braid angle and in a longitudinal section of the second type, the braid members of the relevant strain transformer may have a second, different, braid angle.

Another aspect relates to distributed fibre optic sensor comprising a fibre optic cable structure according to any of the embodiments described herein and an interrogator unit for interrogating the optical fibre of the fibre optic cable structure with optical radiation and detecting and processing optical radiation backscattered from within the optical fibre to provide a measurement signal from each of a plurality of measurement channels.

The interrogator unit may comprises a processor configured to filter the measurement signal from at least one measurement channel in the frequency domain so as to identify signals corresponding to acoustic wavelengths propagating at different angles relative to an axial direction of the fibre optic cable structure. The interrogator unit may be operable so as to provide said measurement signals from said measurement channels for a plurality of different gauge lengths. The interrogator unit may be configured to perform a plurality of interrogations of the optical fibre, wherein for at least some of the interrogations the properties of the optical radiation are varied so as to define said different gauge lengths within the optical fibre. The interrogator unit may be configured to process optical radiation backscattered from within the optical fibre at different spatial resolutions so as to define said different gauge lengths within the optical fibre.

In some embodiments, each of the different gauges lengths may correspond to the length of an integer number of longitudinal sections of the first type and the same number of longitudinal sections of the second type. In some embodiments the interrogator unit may comprise a processor configured process measurement signals from the sensing portions with different gauge lengths to determine an intensity of acoustic signals propagating from different directions. In some embodiments the processor is configured process measurement signals from different measurement channels at different locations of the optical fibre of the fibre optic cable structure to provide beamforming.

The distributed fibre optic sensor may be a distributed acoustic sensor.

It should be noted that unless expressly indicated to the contrary, or otherwise clearly incompatible, any of the features of the embodiments described herein may be implemented and/or used in combination with any one or more of the other features described.

BRIEF DESCRIPTION OF THE DRAWINGS

The invention will now be described by way of example only with respect to the accompanying drawings, of which.

DETAILED DESCRIPTION

Figure 1:
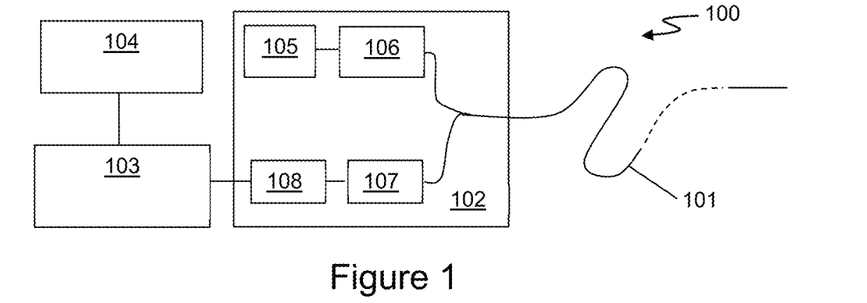
FIG. 1 illustrates a conventional DAS sensor apparatus.

FIG. 1 shows a schematic of a fibre optic sensing arrangement 100, which in this example is a distributed fibre optic sensing arrangement. A length of optical fibre 101 is removably connected at one end to an interrogator 102, which, in use, interrogates the optical fibre to provide sensing of environmental disturbances acting on the optical fibre. The optical fibre 101 will be referred to herein as a sensing optical fibre or just a sensing fibre.

The measurement signals from interrogator 102 may, in some implementations, be passed to a signal processor 103, which may be co-located with, or integrated into, the interrogator or may be remote therefrom. Optionally there may also be a user interface/graphical display 104, which may be co-located with the signal processor or may be remote therefrom and in practice may be realised by an appropriately specified PC.

The sensing fibre 101 can be many kilometres in length and can, in some applications be tens of kilometres in length, say up to 40 km or more. For distributed fibre optic sensing, the sensing fibre 101 may be a standard, unmodified single mode optic fibre such as is routinely used in telecommunications applications without the need for deliberately introduced reflection sites such a fibre Bragg grating or the like. The sensing optical fibre will be protected by containing it with a cable structure which may contain more than one optical fibre. In embodiments of the disclosure the cable structure may be configured to provide a specific response to incident strains, as will be discussed in more detail below.

In use, the fibre optic cable comprising the sensing fibre 101 is deployed in an area of interest to be monitored. Depending on the particular use case, the sensing fibre may be deployed in a relatively permanent manner, e.g. being buried or otherwise secured in place. The interrogator 102 may be removably coupled to the sensing optical fibre 101, and thus in some instances, if continuous monitoring is not required, the interrogator 102 may be removed from the sensing fibre 101 when sensing is not required, possibly leaving the sensing fibre in situ.

In operation, the interrogator 102 launches coherent electromagnetic radiation, e.g. optical radiation, into the sensing fibre. The electromagnetic radiation launched into the sensing fibre by the interrogator 102 will be referred to herein as interrogating radiation. The sensing fibre may, for instance, be repeatedly interrogated with optical radiation in a series of interrogations. In some examples a single pulse of optical radiation may be used for each interrogation, although in some embodiments multiple pulses may be used, in which case the optical pulses may have a frequency pattern as described in GB patent publication GB2,442,745 or optical characteristics such as described in WO2012/137022, the contents of which are hereby incorporated by reference thereto. In some instances the sensing fibre could be interrogated with relatively continuous optical radiation which is modulated, e.g. in phase or amplitude, according to a defined code, such as described in WO2017/037453, with each instance of a code being an interrogation. Note that as used herein the term "optical" is not restricted to the visible spectrum and, for the avoidance of doubt, optical radiation as used herein includes infrared radiation and ultraviolet radiation. Any reference to "light" should also be construed accordingly.

As described in GB2,442,745, WO2012/137022 or WO2017/037453 the phenomenon of Rayleigh backscattering results in some fraction of the light input into the fibre being reflected back to the interrogator, where it is detected to provide an output signal which can be representative of acoustic disturbances in the vicinity of the fibre. The interrogator therefore conveniently comprises at least one laser 105 and at least one optical modulator 106 for producing interrogating radiation, for example pairs of interrogating pulses separated by a known optical frequency difference. The interrogator also comprises at least one photodetector 107 arranged to detect radiation which is Rayleigh backscattered from the intrinsic scattering sites within the sensing fibre 101. A Rayleigh backscatter DAS sensor is very useful but systems based on Brillouin or Raman scattering are also known.

For a distributed fibre optic sensor, the backscatter from the sensing optical fibre 101 will depend on the distribution of the inherent scattering sites within the optical fibre, which will vary effectively randomly along the length of the fibre. Thus the backscatter intensity from any given interrogating pulse will exhibit a random variation from one sensing portion to the next but, in the absence of any environmental stimulus, the backscatter intensity from any given sensing portion should remain the same for each repeated interrogation (provided the characteristics of the interrogating pulse remains the same). However an environmental stimulus acting on the relevant sensing portion of the fibre can result in an optical path length change for that section of fibre, e.g. through stretching/compression of the relevant section of fibre and/or a refractive index modulation. As the backscatter from the various scattering sites within the sensing portion of fibre will interfere to produce the resulting intensity, a change in optical path length will vary the degree of interference. The variation in distribution of the scattering sites will result in a variation in intensity of backscattered from an affected sensing portion, which can be detected and used as an indication of a disturbance acting on the fibre, such as an incident acoustic wave. Additionally or alternatively, if each interrogation comprises spatially separated pulses at different frequencies to one another, or the backscatter is mixed with a local oscillator signal at a different frequency, the change in optical path length for a sensing portion will result in a change in phase of a carrier signal at the difference frequency, which can be detected and used as an indication of the disturbance.

The signal from the photodetector may thus be processed by processing module 108 of the interrogator 102 to provide a measurement signal which is representative of disturbances acting on the sensing portions or channels of the fibre. Some processing may additionally or alternatively be done by signal processor 103. As noted, in some implementations, the processing may demodulate the returned signal based on a frequency difference between optical pulses of the interrogating radiation. For a system that uses relatively continuous radiation, the processing module 108 may also correlate the backscatter with the defined code so as to allow spatial discrimination of the backscatter. The processing module 108 may, in some implementations, process the detected backscatter for example as described in any of GB2,442,745, WO2012/137021, WO2012/137022 or WO2017/037453, depending on the form of the interrogating radiation. In some implementations the processing may determine a phase value from the backscattered light, e.g. the phase of a signal component at a defined carrier frequency. As described previously any changes in the effective optical path length within a given section of fibre, such as would be due to incident pressure waves causing strain on the fibre, can therefore be detected.

The form of the optical input and the method of detection allow a single continuous fibre to be spatially resolved into discrete longitudinal sensing portions. That is, a measurement signal indicative of disturbance at one sensing portion, i.e. indicative of an incident acoustic wave, can be provided substantially independently of a measurement signal for another sensing portion. Note that the term acoustic, as used herein, shall be taken to mean any type of pressure wave or mechanical disturbance or varying strain generated on the optical fibre and will, for instance, include seismic waves or the like. The term acoustic is intended to refer to the type of stimulus acting on the sensing fibre but is not used to imply any particular frequency limitation. As used in this specification the terms "distributed fibre optic sensing" and "distributed acoustic sensing" will be taken to mean sensing by optically interrogating an optical fibre to provide a plurality of discrete sensing portions distributed longitudinally along the fibre and the terms "distributed fibre optic sensor" and "distributed acoustic sensor" shall be interpreted accordingly.

Such a sensor may be seen as a fully distributed or intrinsic sensor, as it uses the intrinsic scattering process inherent in an optical fibre and thus distributes the sensing function throughout the whole of the optical fibre.

Such DAS sensors can be usefully employed in a range of applications to provide information about environmental disturbances acting on the sensing fibre for each of a plurality sensing portions. This can be used, for example, to detect the occurrence of events of interest and/or to allow some characterisation or analysis of the event.

The position of a sensing portion along the length of the sensing fibre is determined as part of the processing, and thus a general indication of the location of an event of interest may be determined by identifying which sensing portions detect acoustic signals corresponding to the event of interest. It may also be possible, in some circumstances, to arrange one or more sensing fibres in a non-linear spatial configuration to detect acoustic signals originating from a common acoustic source. If the arrangement of the sensing portions is known, and the response to a given acoustic event can be separately identified in the measurement signal from the different sensing portions, then time-of-arrival type techniques may be used to provide some indication of location of the acoustic source. However, in some applications it may not be possible or practical to arrange different sensing portions with a sufficient spatial distribution to allow such techniques to be applied.

The present disclosure relates to fibre optic cable structures that are suitable for distributed fibre optic sensing and which may provide improved and/or additional functionality, for example with respect to determining information regarding a direction or angle of incidence for incident acoustic waves. The present disclosure also relates to the design, manufacture and/or use of such fibre optic cables structures.

A fibre optic cable structure according to an embodiment includes an optical fibre suitable for use as a sensing optical fibre, and is configured such that different parts of the structure exhibit a different strain response to one another, i.e. different parts of the fibre optic cable exhibit different transfer characteristics between a given stimulus applied externally to the fibre optic cable structure and a resulting change in effective optical path length within the sensing fibre. In particular, the fibre optic cable structure may be configured to have at least one longitudinal section of a first type, which exhibits a change in effective optical path length of one polarity in response to a given applied force, and which is adjacent to a longitudinal section of a second type, which exhibits a change in effective optical path length of the opposite polarity in response to an equivalent applied force.

For example, the first type of longitudinal section may exhibit a positive change in effective optical path length (of the sensing fibre) to a defined stimulus (when applied to that longitudinal section) and the second type of longitudinal section may exhibit a negative change in effective optical path length to an equivalent defined stimulus applied to that section. Thus, a certain force, or pressure, stimulus applied to a first type of longitudinal section would result in a positive change in effective optical path length for that longitudinal section, whereas if the same force or pressure stimulus were instead applied to a second type of longitudinal section, that force would result in a negative change in effective optical path length for that longitudinal section. In at least some examples the fibre optic cable structure may be configured such that a given variation in transverse force/pressure applied to the fibre optical cable would result in a change in longitudinal strain of opposite polarity in the first and second types longitudinal sections.

The first and second types of longitudinal sections may thus be identified as having a positive-response or negative-response respectively to a defined stimulus. A longitudinal section may thus be referred to herein as a positive-response section (or portion or region) if it provides a positive-response to a defined force or pressure stimulus, and as a negative-response section (or portion or region) if it provides a negative-response to that defined force or pressure stimulus. In general in the examples discussed herein, the defined force or pressure stimulus will be defined as an increase in pressure acting on the cable structure, such that a positive-response section is one that exhibits a positive change in effective optical path length to an increase in applied pressure, and conversely exhibits a negative change in effective optical path length to a decrease in applied pressure, and a negative-response section is one which exhibits the opposite response. It will be appreciated, however, that it would alternatively be possible to define the defined force or pressure stimulus as a decrease in pressure acting on the cable structure, so that a positive-response section could be seen as one that exhibits an increase in effective optical path length in response to a decrease in applied pressure.

A fibre optic cable structure according to some embodiments thus includes at least one positive-response section adjacent a negative-response section. If the positive-response section and the negative-response section both experience an increase in applied pressure/force, the positive-response section will exhibit a positive change in effective optical path length, whereas the negative-response section will exhibit a negative change in effective optical path length. If these positive-response and negative-response sections are both within the same sensing portion of the sensing fibre when used for DAS, these changes in effective path length of opposite polarity can, at least partly, cancel one another out. However, if an increase in pressure were applied to the positive-response section say whilst a decrease in pressure were applied to the negative-response section (or vice versa), both sections would exhibit a change in effective optical path length of the same polarity. In that case, if a sensing portion included both the positive-response and the negative-response sections, the effective path length changes would sum, so as to provide an overall change in effective optical path length of greater magnitude.

Figure 2A:
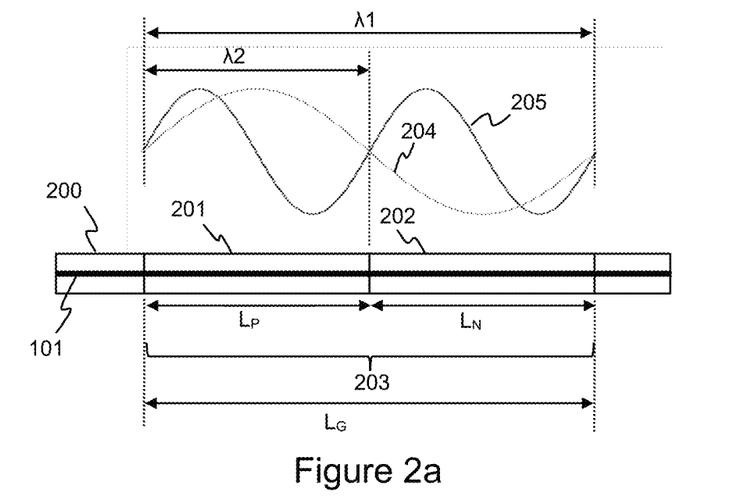
FIGS. 2a and 2b illustrate an example of a fibre optic cable structure according to an embodiment and examples of applied pressure waveforms.
Figure 2B:
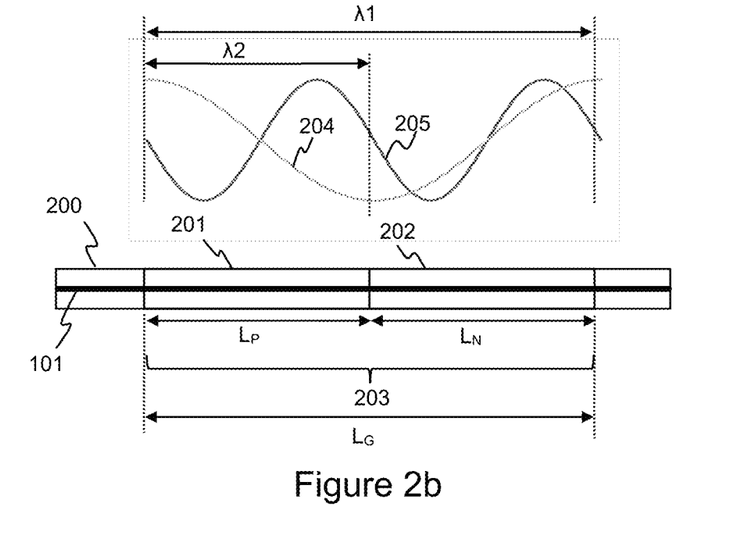

This means that a sensing portion that includes both positive-response and negative-response sections will have a sensitivity to incident acoustic waves that will vary depending on the wavelength of the acoustic wave. FIGS. 2a and 2b illustrate this principle.

FIGS. 2a and 2b illustrate schematically a fibre optic cable structure 200 comprising an optical fibre 101 suitable for distributed acoustic sensing. FIGS. 2a and 2b illustrates that the fibre optic cable structure 200 comprises a positive-response longitudinal section 201 of length Lp and a negative-response longitudinal section 202 of length LN. Preferably the two longitudinal sections 201 and 202 have substantially the same length as one another, i.e. Lp=LN. In use the sensing fibre 101 can be coupled to a suitable interrogator (not shown in FIG. 2), such-as-such as interrogator 102 described with reference to FIG. 1 and, in this example, the interrogator 102 interrogates the sensing fibre 101 such the first and second longitudinal sections 201 and 202 collectively form a sensing portion 203 of the sensing optical fibre with a length LG (equal to Lp+LN). The length LG, which may be defined by the form of the interrogating radiation, shall be referred to herein as the gauge length, as will be understood by one skilled in the art.

FIG. 2a also illustrates an example of a pressure or strain waveform 204 acting on the sensing portion 203 such as may result from an incident acoustic wave. In this example the waveform 204 generally has the form of a sine wave with a wavelength λ1 which is equal to the gauge length $L_G$. This waveform is intended to represent a positive and negative pressure variation, or dynamic strain, about a quiescent level due to some acoustic stimulus, as will be understood by one skilled in the art. In this example of FIG. 2a the waveform 204 is illustrated so that the positive part of the waveform 204, i.e. increased pressure or force or strain, coincides the with the positive-response section 201, and thus there will be a net positive change in effective optical path length over this section. The negative part of the waveform 204 coincides the with the negative-response section 202, which means that the negative-response section 202 will also exhibit a net positive change in effective optical path length over this section. The result will thus be that over the whole length of the sensing portion 203, there will be an effective optical path length change that is the sum of the contributions from each of the sections 201 and 202, which combine so as to increase the overall magnitude of the change in effective optical path length (compared to a path length change due to just one of the sections individually).

By contrast, FIG. 2a also illustrates an alternative waveform 205, which in this example has the form of a sine wave with a wavelength λ2 equal to half the gauge length $L_G$. In this example, a pressure variation over one wavelength of the waveform 204 is applied to the positive-response section 201. Thus, an increase in effective optical path length in one part of the positive-response section 201, due to the positive part of the waveform, is offset by a decrease in effective optical path length in another part of the positive-response section 201, due to the negative part of the waveform. The result may be effectively no change in effective optical path length over the whole of the positive-response section 201. Likewise, a pressure variation over one wavelength of the waveform 204 is also applied to the negative-response section 202. The optical path length changes over each of sections 201 and 202 thus sum to substantially zero.

As the acoustic wave propagates, the arrangement of the positive and negative parts of the waveforms 204 and 205 with respect to the positive-response section 201 and negative-response section 202 will vary. For example FIG. 2b illustrates waveform 204 where the negative part of the waveform 204 is spread equally between the positive-response section 201 and the negative-response section 202, with these sections also receiving equal amounts of the positive parts of the waveform 204. In this situation the positive and negative pressures applied to the positive-response section 201 will result in changes in effective optical path length that at least partly cancel one another and the same will occur for the negative response section. For the waveform 204, as the wave propagates, the response from sensing portion 203 will vary from a maximum positive change in effective optical path length in the situation illustrated in FIG. 2a, with the positive and negative parts of the waveform aligned with the positive and negative-response sections respectively, to a substantially zero change in the effective optical path length in the situation illustrated in FIG. 2b, and then to a maximum negative change in effective path length when the positive part and negative parts of the waveform 204 aligned with the negative and positive-response sections respectively, i.e. the inverse of the situation illustrated in FIG. 2a.

For waveform 205 however, as the wave propagates there is always a full wavelength of pressure variation applied to each of the positive and negative response sections, and the optical path length changes over each of sections 201 and 202 thus sum to substantially zero. The sensing portion 203 will thus, over time, provide a relatively strongly detectable change in effective optical path length for waveform 204 but will be relatively insensitive to waveform 205.

In at least some embodiments of the present disclosure, the fibre optic cable structure comprises a plurality of positive-response sections interspersed with a plurality of negative-response sections and, conveniently the length of the positive response sections and the negative response sections are substantially the same length as one another. This arrangement provides the ability that the sensing optical fibre can be separately interrogated with different gauge lengths to include or exclude certain combinations of wavenumbers by summation.

In at least some embodiments, the positive response sections and negative response sections may be configured to exhibit equal and opposite responses to a given stimulus, i.e. such that a given pressure will lead to a certain positive path length change in the positive response section and the same pressure will lead to an equal but opposite change in path length in the negative response section.

The gauge length may be varied to any desired length, but conveniently the gauge length may be varied so that the gauge length comprises an equal amount of positive-response and negative response sections. Where the positive response sections and the negative response sections are of equal length Ls as one another are arranged to be alternating with one another, the gauge length may thus be controllable varied to have a length equal to any integer multiple of 2Ls. It will be noted that in such an arrangement the start and end of a sensing portion with a length corresponding to the gauge length need not be aligned with the start and end of the positive and response sections. A sensing portion with a gauge length of 4Ls could, for example, start part way along a first positive-response section, include a complete first negative-response section, a second positive-response section, and second negative-response section, and end part way along a third positive-response section. The overall response for such a sensing portion would correspond to the response from two full positive response and two full negative response sections.

Where the gauge length corresponds to an plurality of positive response sections and negative response sections, the overall response of the relevant sensing portion will correspond to the averaged response of the waveform acting on all of the sensing portions. Any incident waves that result in the response from the negative response sections effectively cancelling the response from the positive response sections will provide substantially no overall response for that sensing portion at that gauge length.

Depending on the type of distributed fibre optic sensor the gauge length may be controllably varied by varying the characteristics of the interrogating radiation and/or the processing applied to the detected backscatter. For example, in one type of distributed fibre optic sensor, each interrogation comprises launching two temporally, and hence spatially, separated pulses into the sensing fibre and detecting an interference signal due to the backscatter from both pulses. In such a distributed fibre optic sensor the gauge length may be varied by varying the temporal, and hence the spatial, separation of the pulses of the interrogation. In some types of distributed fibre optic sensor, the backscatter from an interrogation may be processed to determine a phase value at a plurality of different times corresponding to different locations in the sensing fibre. A spatial derivative of the phase from two different locations may be determined to provide the measurement signal from a sensing portion, with the gauge length defined by the locations processed. The gauge length could thus be selectively varied in the processing and different combinations could be processed separately so as to provide different gauge lengths simultaneously. One skilled in the art will understand how the gauge length may be varied for a given type of distributed fibre optic sensor.

From FIG. 2a it can thus be seen that if the sensing fibre 101 of the fibre optic cable structure 200 were used for DAS with a gauge length of $L_G$, equal to 2Ls, an incident acoustic wave that resulted in a pressure or strain variation along the axis of the cable structure 200 with a wavelength that is equal to the gauge length would produce a relatively large variation in effective path length. Such a sensing portion would thus provide a relatively strong measurement signal with a frequency related to the propagation of the acoustic wave, and hence the propagation of the pressure variation along the sensing fibre.

Such a sensing portion may have reduced sensitivity to pressure or strain variations along the length of the cable at other wavelengths. For shorter wavelengths, at the time when the whole of the positive part of the waveform is acting on the positive response section, at least part of the negative part of the waveform will also be acting on that positive response section, and thus the overall response of the positive response section 201 would be reduced. Likewise, the negative response section will always receive at least part of the positive part of the waveform and at least part of the negative part of the waveform. For a longer wavelength, when the maximum positive pressure is being applied to the positive response section 201, the negative response section 202 will also be experiencing some positive pressure and thus the response of the negative response section 202 will at least partly cancel the response of the positive response section 201.

Thus, using a gauge length which corresponds to one positive response section and one negative response section, the DAS sensor may be preferentially sensitive to disturbances acting on the fibre optic cable structure that provides a pressure variation with a resolved wavelength equal to this gauge length. The wavelength of the pressure or strain variation acting on the sensing fibre depends on the effective wavelength of the acoustic wave along the fibre optic cable structure, which depends on the angle of incidence of the acoustic wave to the fibre optic cable structure 200 and sensing fibre.

Figure 3:
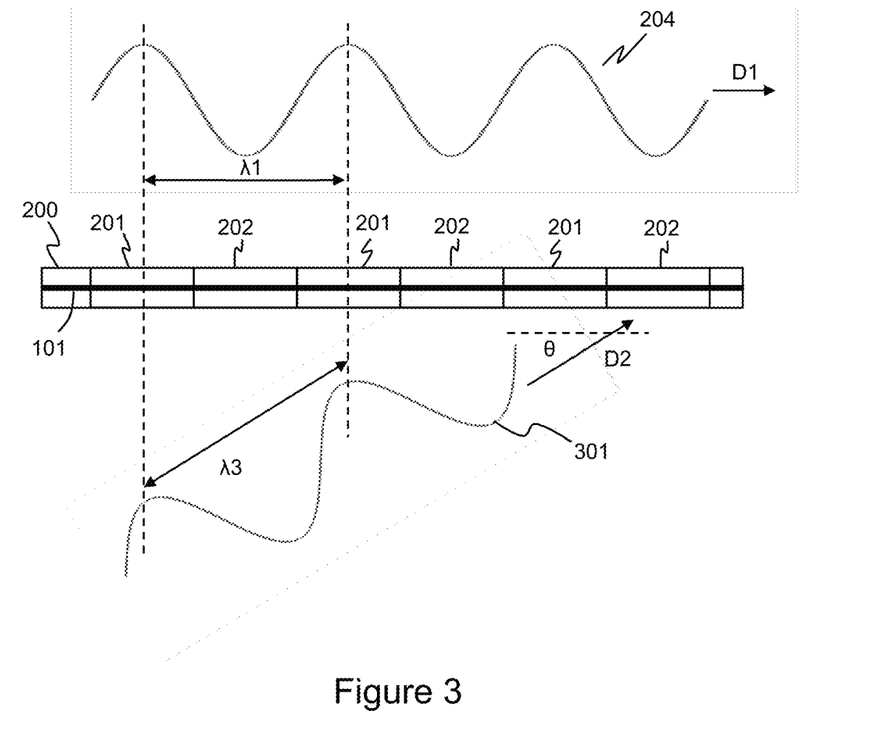
FIG. 3 illustrates the principles of incident waves at different angles having different effective wavelengths.

FIG. 3 illustrates this principle. FIG. 3 illustrates a fibre optic cable structure 200 with a plurality of positive response sections 201 interspersed with a plurality of negative response sections 202 in a similar manner as described above. FIG. 3 illustrates an acoustic wave 204 with a wavelength λ1 propagating in a direction D1 which is parallel to the axis of the fibre optic cable structure 200. In this example the wavelength λ1 is equal to the length of a positive response section and adjacent negative response section. As discussed above in relation to FIG. 2, if the sensing fibre were used for DAS with a gauge length comprising a positive response section and a negative response section, the DAS sensor may be preferentially sensitive to such wavelengths FIG. 3 also illustrates another acoustic wave 301 propagating in a direction D2 at a non-zero angle θ to the cable axis. This acoustic wave has a wavelength λ3, which is greater than λ1, but the effective wavelength as experienced as a pressure profile variation by the sensing fibre, is lower than actual wavelength by a factor of cos e so that, in this example, the effective wavelength along the axis of the fibre optic cable structure is equal to λ1.

It will thus be understood that using a gauge length $L_G$ which includes one positive response section 201 and one negative response section 202 as described above, the sensitivity of the fibre optic cable structure when used for DAS will depend on the actual wavelength of an incident acoustic wave and also the angle of incidence.

Figure 4:
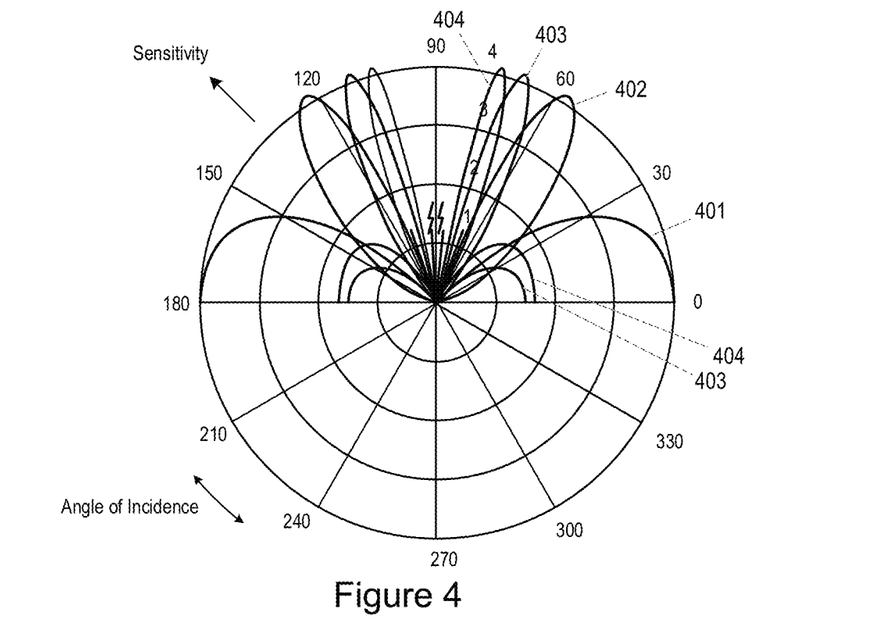
FIG. 4 illustrates a polar plot of directional sensitivity for different wavelength.

FIG. 4 illustrates a polar plot of directional sensitivity for different wavelengths, where sensitivity is represented as increasing with increased distance from the centre of the plot. Plot 401 represents the sensitivity profile for an acoustic wave with a wavelength equal to gauge length $L_G$ and plots 402, 403, and 404 are the plots for acoustic waves with wavelengths equal to two times, three times and four times the gauge length respectively.

Using a fibre optic cable structure with positive and negative response sections as described above can thus allow the fibre optic cable structure, when used for DAS with a particular gauge length, to be preferentially sensitive to certain effective wavelengths, which thus provides directional sensitivity for certain wavelengths at certain angles of incidence. Temporally filtering the resultant measurement signals from the DAS sensor in the frequency domain and knowing the separation of positive and negative response regions and the gauge length, means that wavelengths propagating at different angles relative to the axial direction of the cable can be selected. Varying the gauge length allow different combinations of wavenumbers to be included or excluded. By interrogating the sensing optical fibre with a number of different gauge lengths and filtering appropriately, a map of the intensity of acoustic signals propagating from different directions can be determined.

It should be noted that the different lobes of the polar plot of FIG. 4 have a different strain response, which may destroy the strain sign retrieved from the cable, however by determining the wave propagation direction from multiple gauges will allow this to be resolved.

In use therefore the sensing fibre may be interrogated with interrogating radiation and the detected backscatter processed so as to provide measurement signals from a plurality of different sensing portions at at least one gauge length.

The measurement signals from a given sensing portion are temporally filtered to extract the contributions from waves propagating in particular directions based on the known gauge length.

The parameters of the temporal filter may be a function of the length of the positive and negative response sections, as well as the gauge length and the local acoustic velocity.

As noted above the combination of the response of the various positive and negative response sections within the gauge length effectively acts as a filter to select particular wavenumbers. Temporal filtering based on the acoustic velocity, and the known gauge length, allows selection of a particular direction of incidence. In some implementations the temporal filtering may provide bandpass filtering, although there may be some applications where highpass or low pass filtering may be preferred where certain wave components are required to be included/excluded.

For instance, in practice there may not be much variation in directional response for wave components with wavelengths close to the gauge length. Thus there may be limited benefit in filtering tightly around the appropriate frequencies. For example it may be sufficient to distinguish frequencies associated with a wavelength equal to the gauge length from frequency at say 1.25 times the gauge length. Purely as an example, for a gauge length of 8 m and an acoustic velocity of 200 $ms^{-1}$, filtering with a cut off frequency around 20 Hz may provide a directional response associated with a wavelength equal to the gauge length whereas a cut off of 25 Hz may provide the response associated with wavelength of 1.25 times the gauge length.

For wavelengths at large multiples of the gauge length, the variation in directional response may also be limited above a certain wavelength multiple.

A fibre optic cable structure as described herein may be implemented by providing a strain transformer as part of the fibre optic cable structure. The positive response and negative response sections may be implemented by tailoring the properties of strain transformer and/or its interaction with the rest of the cable structure in the relevant sections.

Fibre optic cable structures that include strain transformers have been proposed, but conventionally the strain transformer is provided so as to provide a consistent response along the length of the fibre optic cable structure.

As the sensing response of conventional DAS sensors is to changes in effective optical path length of the sensing fibre, the sensing fibre will generally be most sensitive to longitudinal strains acting on the optical fibre. For a sensing fibre optic deployed in a medium along a generally straight path, the sensing fibre will thus be most sensitive to pressure waves in the medium that are propagating in a direction longitudinally along the fibre. For such longitudinal waves the fibre length is directly affected by the pressure change as the medium compresses and expands as the wave propagates. For waves travelling perpendicularly to the optical fibre the sensitivity is lower as the fibre will largely be moved from side to side with the medium. There will be some longitudinal strain due to the displacement of the fibre and also from the diameter change of the fibre as the pressure wave passes but the effect will be much lower than for an equivalent wave travelling longitudinally.

In at least some applications however the signals of most interest may be signals which are incident on the cable from a generally transverse direction, i.e. broadside to the cable, i.e. such that there is a substantial transverse component.

It has been proposed to improve the sensitivity of a fibre optic cable structure to transverse strains by incorporating a strain transformer into the cable structure which acts to transform transverse strains into axial strains. WO2016/055787 describes a fibre optic cable structure with a strain transformer, which may for instance comprise a braid structure, which can provide an improved response to transverse strains or pressure.

Figure 5:
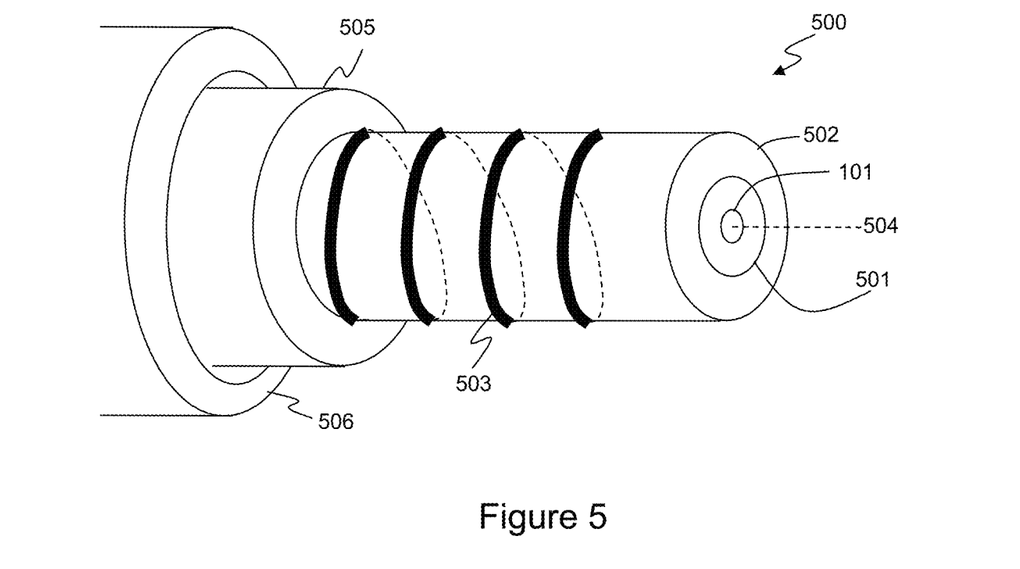
FIG. 5 illustrates; an example of a fibre optic cable structure with a strain transformer.

FIG. 5 illustrates a perspective cutaway view of a fibre optic cable 500 including a strain transformer. The fibre optic cable comprises at least one optical fibre 101 which may be a conventional unmodified optical fibre suitable for distributed fibre optic sensing as described above. Only one optical fibre 101 is illustrated in FIG. 5 for clarity but it will be appreciated that the cable could comprise a plurality of optical fibres. Each optical fibre may comprise a core and cladding as would be understood by one skilled in the art. The optical fibre may also comprise at least one fibre jacket material.

The optical fibre(s) 101 may be coupled to a tight buffer material 501 which is itself coupled to a compliant material 502 which forms at least part of a cable core holding the optical fibre(s) 101. The coupling between the optical fibre 101 and the compliant material 502 is such that a dynamic longitudinal strain applied to the compliant material will induce a longitudinal strain in the optical fibre. In other words a longitudinal displacement of the cable core material 502 will result in a longitudinal displacement of the buffer material 501 (if present) and correspondingly the optical fibre 101. Thus, the optical fibre will not slide significantly within the core material 502 or buffer 501, at least for dynamic strains resulting from pressure waves of the frequencies of interest. In some embodiments the material 502 of the compliant core may also act as the buffer material 501, i.e. a separate buffer material 501 may not be required.

In some embodiments the buffer material 501 may be a gel or gel-like material. Various gel buffers are known for fibre optic cables. A relatively sudden longitudinal movement of the compliant core material 502 will cause a longitudinal movement in a gel buffer material which will be transmitted to the embedded optical fibre 101. Thus a gel buffer can provide the coupling described above. However if the fibre optic cable is subject to relatively large and slow, i.e. low frequency strains, such as may be experienced during installation or handling of the fibre optic cable for instance, a gel buffer material may relax the strain experienced by the optical fibre. Thus use of a gel buffer material may help reduce the risk of damage during installation and handling whilst still providing good coupling at the frequencies of interest. Gel buffered fibre optic cables based on a conventional design, i.e. without a strain transformer, have been used previously as DAS sensing fibres and have performed well for incident longitudinal waves, showing good coupling between the fibre, gel buffer and outer cable layers at acoustic frequencies of interest.

Mechanically coupled to the compliant material 502 is at least one strain transformer which in this embodiment comprises a coiled member 503.

The coiled member 503 may, in at least some locations, be bound to the compliant material 502 so that the compliant core material moves with the strain transformer. In some embodiments the strain transformer may be anchored to the compliant core material at various anchor points and/or at least part of the coiled member 503 may be embedded within the compliant core material. The coiled member in this example is coiled around the longitudinal cable axis 504 in a generally helical fashion and is surrounded by at least one cable jacket material 505. Note that in the example of FIG. 5 the optical fibre 101 is illustrated as lying along the cable axis 504, however in some embodiments there may be a benefit in the optical fibre 101 being disposed off the cable axis 504.

The cable jacket material may be arranged so that any pressure acting on the jacket material may be preferentially transferred to the strain transformer, rather than the compliant core material. In other words substantially no or only limited pressure may be transferred directly to the compliant core material from the jacket material.

The coiled member 503 of the strain transformer may be relatively stiff and may be stiffer than the compliant material 502, and the buffer material 501 if present. The coiled member is however deformable in a radial direction in response to a dynamic transverse strain.

A strain transformer such as described in WO2016/055787 may conventionally have been arranged such that a radial deformation of the coiled member 204 translates into a longitudinal length change, with a longitudinal strain applied to the compliant core material.

Pressure on the outside of a fibre optic cable is transferred into change in effective optical path length by two main effects. The first is the physical change in length of the cable as the surface pressure is changed. The second is by the effect of the pressure on the effective refractive index of the fibre. The principle behind the strain transformer is to use a stiffening structure within the cable to mechanically enhance the way that diametrical strain (i.e. radial or transverse strain) is transferred to longitudinal strain.

The inclusion of the strain transformer can thus provide a controlled increase in the longitudinal strain experienced by the optical fibre in response to a given transverse strain or pressure variation acting on the cable.

Figure 6:
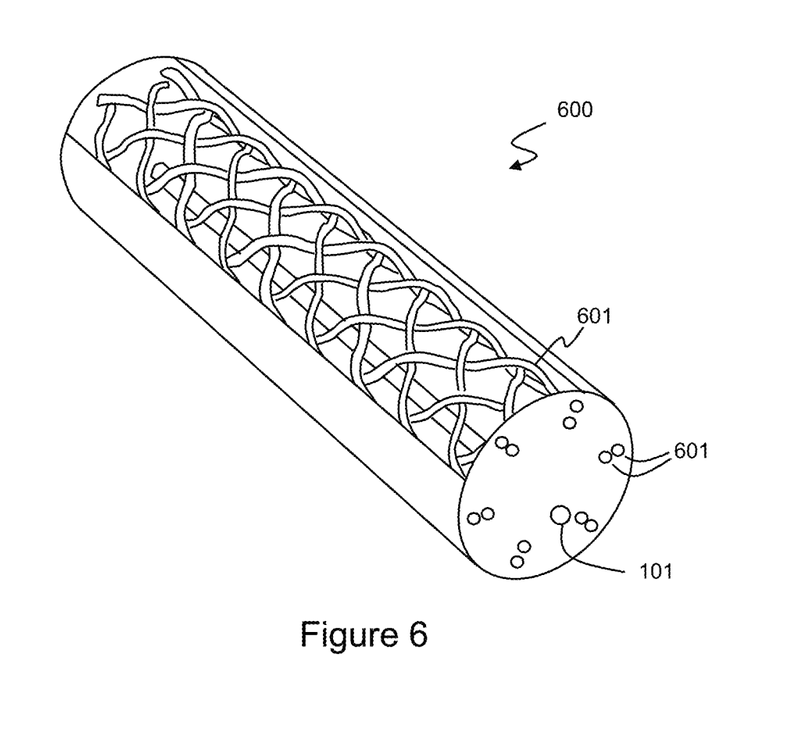
FIG. 6 illustrates an example of a suitable strain transformer arrangement.

It will be noted that FIG. 5 illustrates a single, continuously coiled member for the strain transformer 503. However more complex arrangements are possible, for instance there may multiple windings in an interleaved or braided arrangement which co-operate to provide the desired response. FIG. 6 illustrates a perspective cutaway section of a fibre optic cable structure 600 that includes a sensing optical fibre 101 and a plurality of braid members arranged in an interwoven or interleaving pattern. FIG. 6 illustrates just part of the arrangement of the braid members on one side and omits the compliant core material for clarity.

Previously, strain transformers have been modelled analytically to model the response to incident strains. Analytical modelling is useful, but can be somewhat limited in the complexity of the geometries of strain transformer that can be accurately modelled. By using finite element analysis techniques to determine suitable models, it has been possible to model more complex geometries of strain transformer, such as the geometry illustrated in FIG. 6.

In particular, it has been found that the strain induced on the sensing optical fibre in a cable structure with a strain transformer will depend on the cross-sectional stiffness of members of the strain transformer, which is affected by material properties and size and geometry, friction between contact points and wrap angle. The response can additionally or alternatively be controlled by constraining the ability of the members of the strain transformer to move, for instance by embedding the strain transformer in some matrix material, which could be the compliant material 502 or some other material provided to control strain transformer properties. Parameters, such as number of braid members, braid member stiffness, braid member diameter, wrap angle or braid pitch length, distance between anchor points, stiffness of the compliant material and/or degree to which the braid members are embedded may be selected to tune the response of the fibre optic cable when used for distributed fibre optic sensing. In particular it has been found that by control of these parameters, either positive or negative strains can be induced within the fibre optic cable, i.e. the strain transformer can be configured with respect to the rest of the cable structure such that a given transverse strain can induce either a positive longitudinal strain or a negative longitudinal strain on the sensing fibre.

For instance, for a fibre optic cable structure with a braided strain transformer, the cable structure may physically extend or contract in response to a given increase in pressure depending on the braid angle of the strain transformer.

In embodiments of the present disclosure the arrangement of the strain transformer with respect to the rest of the fibre optic cable structure may vary along the length of the fibre optic cable structure so as to provide the positive response sections and negative response sections. Any one or more of the parameters described above, may be varied along the length of the optical fibre so as to provide the desired response. In particular in some embodiments the strain transformer may comprise a braided structure of interleaved braid members such as illustrated in FIG. 6 and the cross-sectional size of the braid members used to form the strain transformer may vary along the length of the fibre optic cable structure. Additionally or alternatively, the degree to which the strain transformer is embedded in a matrix material and/or is undercoated or overcoated with material may vary along the length of the fibre. As noted above, the braid angle of the braided structure, i.e. the wrapping angle of the braid, may also control the response of the strain transformer and the braid angle may vary along the length of the cable structure so as to provide the desired response.

Figure 7:
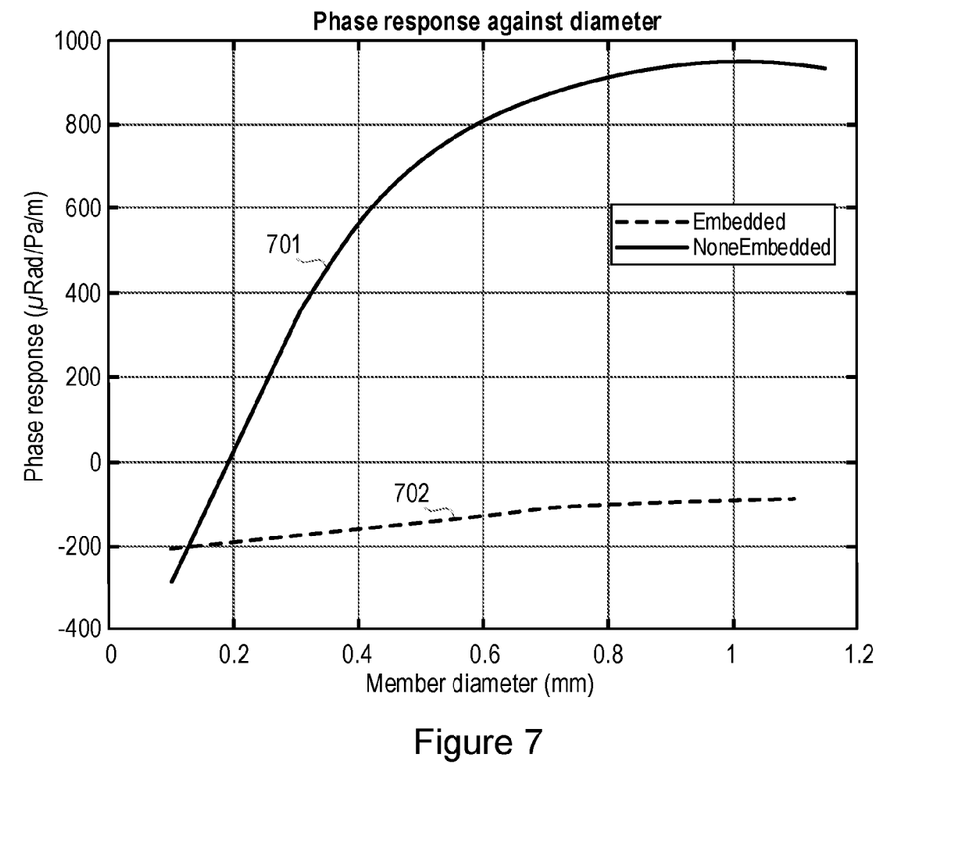
FIG. 7 illustrates the effect of varying properties of a strain transformer on the phase response from the optical fibre using DAS.

FIG. 7 illustrates how, for a fibre optical cable structure including a strain transformer such as described above, the phase response from the sensing optical fibre used for DAS, to a given applied pressure, varies with properties of the strain transformer. Curve 701 illustrates the effect of cross-sectional size of the braid members, i.e. braid members diameter, in millimetres, on strain response, as determined in micro-radians per pascal per metre of sensing fibre for a strain transformer having a braid stricture which is not embedded. It can be seen that, in this example, braid members with a smaller cross-sectional size lead to a negative phase response whereas larger braid member diameters lead to a positive phase response. Thus, when fabricating the strain transformer, the strain transformer in a positive response section may be formed by interleaving members of a suitable material, e.g. steel wires or some other suitable metallic wire, which have a first diameter and the strain transformer in a negative response section may be formed by interleaving members of a suitable material, e.g. steel wires or some other suitable metallic wire, of a second, smaller diameter. Curve 702 illustrates the phase response with member cross-sectional diameter for a strain transformer which is embedded with a material to constrain movement. In this case it can be seen that constraining the strain transformer by embedding it may provide a negative response, even for braid member sizes that would provide a positive response when non-embedded. Thus, in some embodiments a fibre optic cable structure may be formed with the strain transformer embedded in a matrix material in some regions, e.g. negative response sections, but with a reduced degree of, or no, embedding in other regions, such as the positive response sections. The fibre optic cable structure may be formed with the strain transformer and a matrix material may be injected into the strain transformer in some regions as desired.

Embodiments of the present disclosure thus relate to a fibre optic cable structure that comprises an optical fibre suitable for use as a sensing fibre in distributed fibre optic sensing and which is configured to comprise at least one positive response section adjacent at least one negative response section. Preferably there are a plurality of positive and negative response sections interspersed with one another. As described above such a fibre optic cable structure may be usefully used for distributed fibre optic sensing, for example distributed acoustic sensing, to provide an indication of the direction of incidence of incident waves. Embodiments also relate to DAS sensors using such a fibre optic cable structure and to the processing of measurement signals from interrogating such a fibre optic cable structure so as to provide directional sensitivity.

Figure 8:
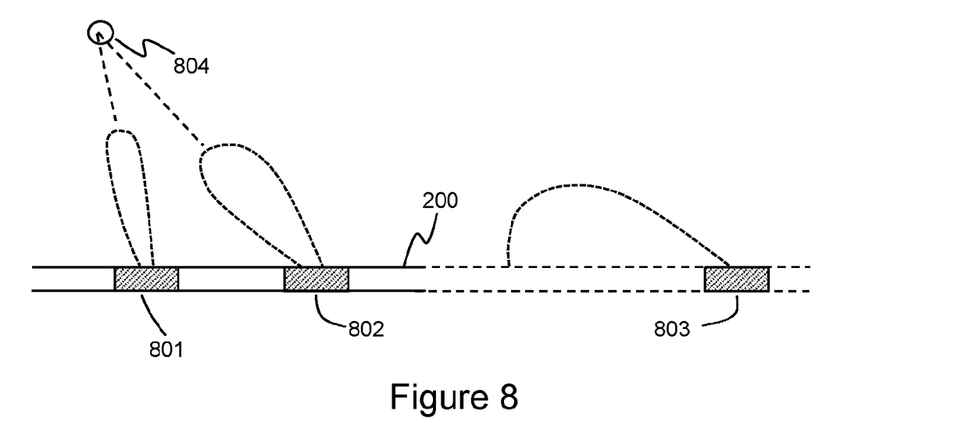
FIG. 8 illustrates an example of using the directional sensitivity for beamforming.

The directional sensitivity of embodiments of the present invention may be useful in a range of different application. In some implementations the techniques described herein could be used to provide beamforming by filtering the returns from different parts of the fibre optic cable structure to provide a desired directional sensitivity for certain wavenumbers. FIG. 8 illustrates a fibre optic cable structure 200 according to an embodiment and illustrates that different sensing portions 801, 802 and 803 at different locations may be processed to provide preferential directional sensitivity for different directions so as to provide beamforming to the location of a broadband source 804.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A fibre optic cable structure, comprising:
an optical fibre for distributed fibre optic sensing;
the fibre optic cable structure being configured to comprise:
at least one longitudinal section of a first type which exhibits a first change in effective optical path length of the optical fibre in response to a given applied force and which is adjacent to
at least one longitudinal section of a second type which exhibits a second change in effective optical path length of the optical fibre in response to an equivalent applied force,
wherein the first change is of one polarity and the second change is of the opposite polarity.

2. The fibre optic cable structure as claimed in claim 1, wherein the fibre optic cable structure comprises a plurality of longitudinal sections of the first type and a plurality longitudinal sections of the second type, with each section of the first type being adjacent to a section of the second type.

3. The fibre optic cable structure as claimed in claim 2, wherein each of the longitudinal sections of the first type and each of the longitudinal sections of the second type have an equal longitudinal length.

4. The fibre optic cable structure as claimed in claim 1, wherein the fibre optic cable structure comprises at least one strain transformer configured to transform a radial strain of the fibre optic cable structure into a longitudinal strain of the fibre optic cable structure, wherein properties of the strain transformer vary along a length of the fibre optic cable structure so as to provide said at least one longitudinal section of the first type and said at least one longitudinal section of the second type.

5. The fibre optic cable structure as claimed in claim 4, wherein the strain transformer comprises a braid structure comprising a plurality of interleaved braid members.

6. The fibre optic cable structure as claimed in claim 5, wherein, in a longitudinal section of the first type, the braid members of respective strain transformer have a first cross-sectional size and in a longitudinal section of the second type, the braid members of the respective strain transformer have a second, different cross-sectional size.

7. The fibre optic cable structure as claimed in claim 5, wherein, in a longitudinal section of the first type, the braid members of respective strain transformer are embedded in a matrix material and in a longitudinal section of the second type, the braid members of the respective strain transformer are not embedded in a matrix material.

8. The fibre optic cable structure as claimed in claim 5, wherein, in a longitudinal section of the first type, the braid members of a respective strain transformer have a first braid angle and in a longitudinal section of the second type, the braid members of the respective strain transformer have a second, different, braid angle.

9. A distributed fibre optic sensor comprising a fibre optic cable structure as claimed in claim 1 and an interrogator unit for interrogating the optical fibre of the fibre optic cable structure with optical radiation and detecting and processing optical radiation backscattered from within the optical fibre to provide a measurement signal from each of a plurality of measurement channels.

10. The distributed fibre optic sensor as claimed in claim 9, wherein the interrogator unit comprises a processor configured to filter the measurement signal from at least one measurement channel in the frequency domain so as to identify signals corresponding to acoustic wavelengths propagating at different angles relative to an axial direction of the fibre optic cable structure.

11. The distributed fibre optic sensor as claimed in claim 9, wherein the interrogator unit is operable so as to provide said measurement signals from said measurement channels for a plurality of different gauge lengths.

12. The distributed fibre optic sensor as claimed in claim 11, wherein the interrogator unit is configured to perform a plurality of interrogations of the optical fibre, wherein for at least some of the interrogations, properties of the optical radiation are varied so as to define said different gauge lengths within the optical fibre.

13. The distributed fibre optic sensor as claimed in claim 11, wherein the interrogator unit is configured to process optical radiation backscattered from within the optical fibre at different spatial resolutions so as to define said different gauge lengths within the optical fibre.

14. The distributed fibre optic sensor as claimed in claim 11, wherein each of said different gauges lengths correspond to a length of a first integer number of longitudinal sections of the first type and a second integer number of longitudinal sections of the second type, wherein the first integer number and the second integer number are the same.

15. The distributed fibre optic sensor as claimed in claim 11, wherein the interrogator unit comprises a processor configured to process measurement signals from said sensing portions with different gauge lengths to determine an intensity of acoustic signals propagating from different directions.

16. The distributed fibre optic sensor as claimed in claim 9, wherein the processor is configured process measurement signals from different measurement channels at different locations of the optical fibre of the fibre optic cable structure to provide beamforming.

17. The distributed fibre optic sensor as claimed in claim 9, wherein the distributed fibre optic sensor is a distributed acoustic sensor.

* * * * *